United States Patent

Uchida et al.

Patent Number: 4,764,338
Date of Patent: Aug. 16, 1988

[54] METHOD FOR OPERATING BOILING WATER-TYPE ATOMIC POWER PLANT

[75] Inventors: Shunsuke Uchida; Katsumi Ohsumi, both of Hitachi, Japan

[73] Assignee: Hitachi, Ltd., Tokyo, Japan

[21] Appl. No.: 705,695

[22] Filed: Feb. 26, 1985

[30] Foreign Application Priority Data

Mar. 1, 1984 [JP] Japan .................................. 59-39296

[51] Int. Cl.⁴ ............................................. G21C 19/30
[52] U.S. Cl. .................................. 376/313; 210/682; 423/6
[58] Field of Search ....................... 576/305, 306, 313; 210/682; 423/6

[56] References Cited

U.S. PATENT DOCUMENTS 4,332,031  5/1982  Barkatt et al. ...................... 376/313

FOREIGN PATENT DOCUMENTS 54-65298  5/1979  Japan .................................. 376/306
138992    8/1984  Japan .................................. 376/313
125598    7/1985  Japan .................................. 376/313

*Primary Examiner*—Deborah L. Kyle
*Assistant Examiner*—Richard W. Wendtland
*Attorney, Agent, or Firm*—Fay, Sharpe, Beall, Fagan, Minnich & McKee

[57] ABSTRACT

In operation of a boiling water-type, atomic power plant, rated operation is conducted while adjusting the pH of core water in the nuclear reactor to 7.0 to 8.5 by adding an alkali thereto, thereby controlling dissolution of radioactive corrosion products attached to fuel rods into the core water. An increase in the radioactive corrosion products in the core water and in the dose rate can be prevented.

9 Claims, 4 Drawing Sheets

METHOD FOR OPERATING BOILING WATER-TYPE ATOMIC POWER PLANT

BACKGROUND OF THE INVENTION

This invention relates to a method for operating a boiling water-type atomic power plant (which will be hereinafter referred to as BWR) with a good effect on control of an increase in the dose rate of its primary cooling system, and particularly to a method for operation in view of quality of core water suitable for controlling a cobalt-60 concentration in core water, more particularly a dose rate of the primary cooling system by controlling the core water to be neutral or slightly alkaline at any time, thereby suppressing dissolution of cobalt-60 deposited on fuel rods.

Basically, BWR is characterized by direct cycle, where the steam generated in a nuclear reactor is directly fed to a turbine to generate electric power.

FIG. 1 shows the major units of BWR primary cooling system and flow in the cooling system, where the cooling water in nuclear reactor pressure vessel 7 is forced to circulate by means of recycle pump 2. The cooling water will be hereinafter referred to as core water. Steam generated in nuclear reactor 1 is fed to turbine 3 after moisture has been removed in a separator and a drier provided above the core. A portion of the steam is withdrawn from the turbine as a turbine bleed steam, and used as a heat source for high pressure and low pressure heaters 4, whereas most of the steam is condensed to water in condenser 5. The condensate is almost completely degasified in the condenser, and the oxygen and hydrogen generated by radiolysis of water in the core can be almost completely removed at the same time.

Generally, the condensate is heated to about 200° C. in the low pressure and high pressure heaters arranged in stages, and again fed to the nuclear reactor. To suppress formation of radioactive corrosion products in the nuclear reactor, ion exchange resin filter 6 such as a desalter, etc. is provided between the condenser and the low pressure heater, and all the amount of the condensed water is treated therein, thereby mainly removing metallic impurities from the condensed water to maintain the condensed water at a high purity.

To reduce formation of metallic impurities due to corrosion of the materials of construction used in the primary cooling system, stainless steel is utilized in principle as the major material of construction. Nuclear reactor pressure vessel 7 made of carbon steel has a build-up welding of stainless steel on the inside surface to prevent the carbon steel from any direct contact with core water. In addition to the consideration of the materials of construction, a portion of core water is purified in core water purifying unit 8 to intensively remove a very small amount of metallic impurites formed in the core water.

In spite of these measures for the materials of construction and water quality control, the presence of a very small amount of metallic impurities in core water is inevitable, and particularly cobalt is radioactivated into cobalt-60 mainly on the surfaces of fuel rods and accumulates on the materials of construction in the primary cooling system to cause an increase in the dose rate in the primary cooling system.

In a pressurized water type atomic power plant (which will be hereinafter referred to as PWR) as another type of light water reactor, a chemical solution is injected into the core water to adjust the dissolved oxygen concentration and maintain pH at 9 or higher in the core water as the measures for controlling the corrosion of the materials of construction.

FIG. 2 shows the major units of PWR primary and secondary systems and its cooling system flow, where the heat generated in the core is transferred to the secondary system in steam generator 9 as a contact point of the primary system with the secondary system, and removed from the primary system. Since the primary system forms a completely closed loop, even the injection of a chemical solution into the primary system as mentioned above requires no discharge from the primary system, resulting in less consumption of the chemical solution. However, to suppress formation of tritium in the primary system, expensive $^7LiOH^-$ is used at a high concentration for pH adjustment. To reduce the amount of $^7LiOH^-$, the capacity of purifying system for the primary system is made to 1/10 or less of that for BWR. As a result, no better removal effect on the formed metallic impurities is obtained, and the concentration of radioactive corrosion products in the primary system for PWR is higher than that for BWR owing to the overall poor control effects on formation and removal of metallic impurities.

When an attempt is made to control the corrosion of materials of construction in the primary cooling system in BWR by injection of a chemical solution as in PWR, the following three problems are encountered in the turbine system. That is, a portion of the injected chemical solution is entrained by steam, and it is necessary to inject a larger amount of the chemical solution to make up the loss of the chemical solution. This necessitates a larger capacity of the injection facility and preparation of a larger amount of the chemical solution. Attack of the chemical solution carried over by the steam to machine members such as turbine blades, etc. causes new damages. Furthermore, radioactivation of alkali metals, for example, into $^{24}Na$, etc. brings about radioactive contamination in the turbine system.

In BWR, the core water is thus controlled to neutral pure water without addition of the chemical solution, as mentioned above. When there is contamination of organic impurities, for example, ion exchange resin, pH is shifted to acidic side, bringing about an unfavorable atmosphere to the materials of construction.

As a result of extensive studies, the present inventors have found the following quite a new fact: when the pH of core water is shifted to the acidic side, dissolution of radioactive corrosion products deposited on the surfaces of fuel rods into core water is increased, and thus the concentration of radioactive corrosion products in the core water is increased, thereby causing accumulation of radioactive corrosion products in the units or piping in the primary cooling system and increasing the dose rate at the nuclear reactor shut-down.

SUMMARY OF THE INVENTION

An object of the present inventinon is to provide a method for operation of BWR capable of controlling corrosion of materials of construction and an increase in dose rate in the primary cooling system without any influence of radioactivation on the turbine system.

The present inventors have studied dependencies on pH of cobalt dissolution rate from cobalt ferrite not to prevent the materials of construction from corrosion but to control an increase in the dose rate, and have found said new fact and have successfuly established the present invention on the basis of the new fact.

In operation of a boiling water-type atomic power plant comprising a nuclear reactor, a turbine generator driven by steam generated in the nuclear reactor, a condenser, a filter based on ion exchange resin, and a feed water heater as major units arranged successively in a circulation system, the present method for operating the boiling water-type atomic power plant is characterized by conducting rated operation while adjusting the pH of core water in the nuclear reactor to 7.0 to 8.5 by adding an alkali thereto, thereby controlling dissolution of radioactive corrosion products attached to fuel rods into the core water, where a procedure for continuous addition of an alkali is proposed on the basis of such experimental results that NaOH is discharged due to a difference in affinity from divalent metal ions such as $Fe^{2+}$, $Ni^{2+}$, $Co^{2+}$, etc. as major components.

PREFERRED EMBODIMENTS OF THE INVENTION

Figure 1:
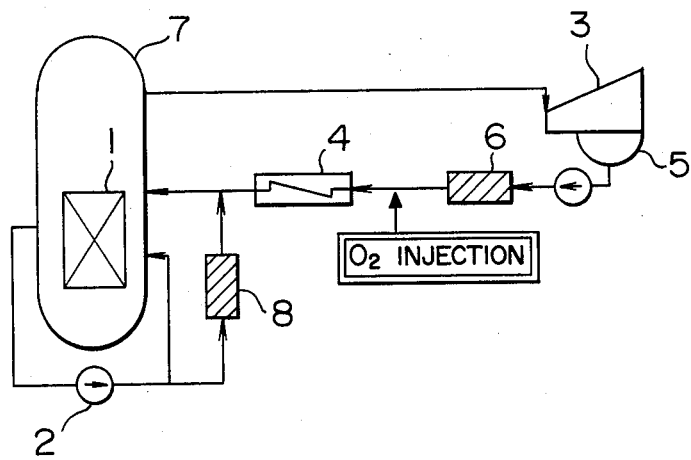
FIG. 1 is a flow diagram showing the major units in the primary cooling system for BWR and the flow of the cooling system.
Figure 2:
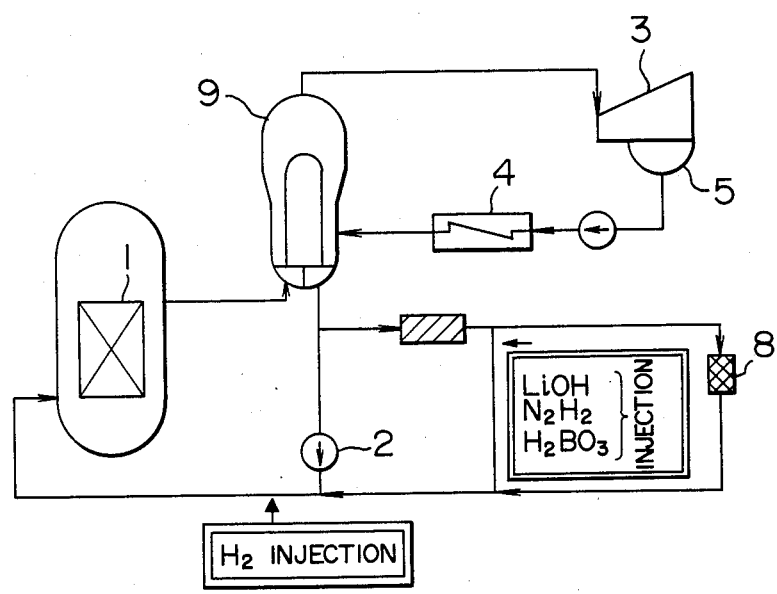
FIG. 2 is a flow diagram showing the major units in the primary and secondary systems for PWR and the flow of the cooling system.

One embodiment of the present invention will be described below, referring to FIG. 3.

Corrosion products brought into nuclear reactor pressure vessel 7 through feed water system 11 deposit on the surfaces of fuel rods and are radioactivated into radioactive corrosion products such as cobalt-60, etc. thereon. A portion of the radioactive corrosion products is again dissolved into core water to migrate through the core water, and deposit and accumulate on the machine member and piping in recycle system 13 such as recycle pump 2, etc. in nuclear reactor housing 12, causing an increase in the dose rate.

The corrosion products on the surfaces of fuel rods are so-called cruds containing iron oxide as the major component, which mainly takes a chemical form of $\alpha$-$Fe_2O_3$, i.e. hematite. Minor components such as nickel, cobalt, etc. are adsorbed onto the hematite to form nickel ferrite, cobalt ferrite, etc.

Figure 4:
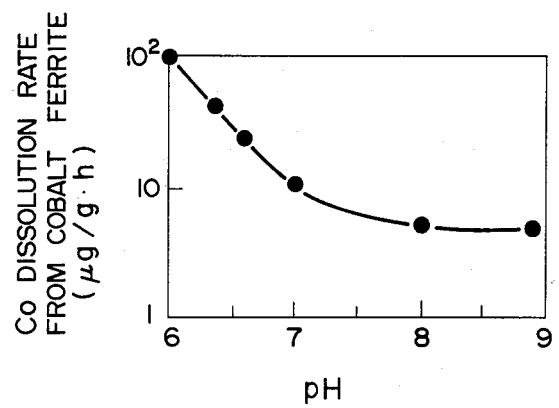
FIG. 4 is a diagram showing influences of pH on the cobalt dissolution rate from cobalt ferrite.

FIG. 4 shows dependency on pH of dissolution rate of cobalt from cobalt ferrite having an average particle size of 1 $\mu m$ ($\mu g/g.hr$). When the pH is lowered, that is, shifted to the acidic side, it can be seen therefrom that the cobalt dissolution rate is abruptly increased.

Figure 5:
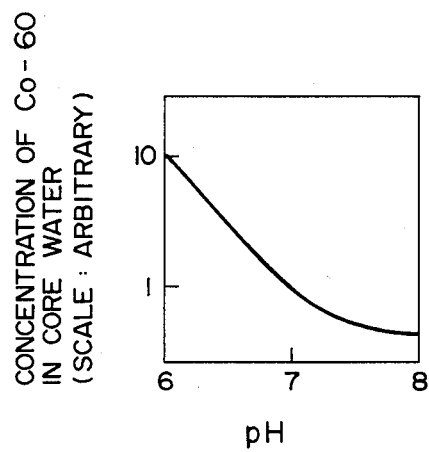
FIG. 5 is a diagram showing influences of core water pH on calculated cobalt-60 concentration in core water.

FIG. 5 shows cobalt-60 concentration in core water calculated on the basis on pH of dissolution rate of cobalt from cobalt ferrite shown in FIG. 4. The main source for cobalt-60 is the surfaces of fuel rods, as described above, and in spite of remarkable change in the amount of dissolved cobalt, the cobalt dissolution rate itself is too low to change the total amount of cobalt-60 retained on the fuel rods, and thus the total amount of cobalt-60 is kept substantially constant. The cobalt-60 concentration in core water is proportional to the amount of cobalt-60 dissolved from fuel rods, that is, to the amount of cobalt from cobalt ferrite.

When the pH in core water is shifted from the neutral to the acidic side, that is, when it is less than pH 7, the cobalt-60 concentration in core water is abruptly increased, whereas, when the pH is shifted to the alkaline side, that is, when it is more than 7, the cobalt-60 concentration is considerably reduced, as shown in FIG. 5.

Figure 3:
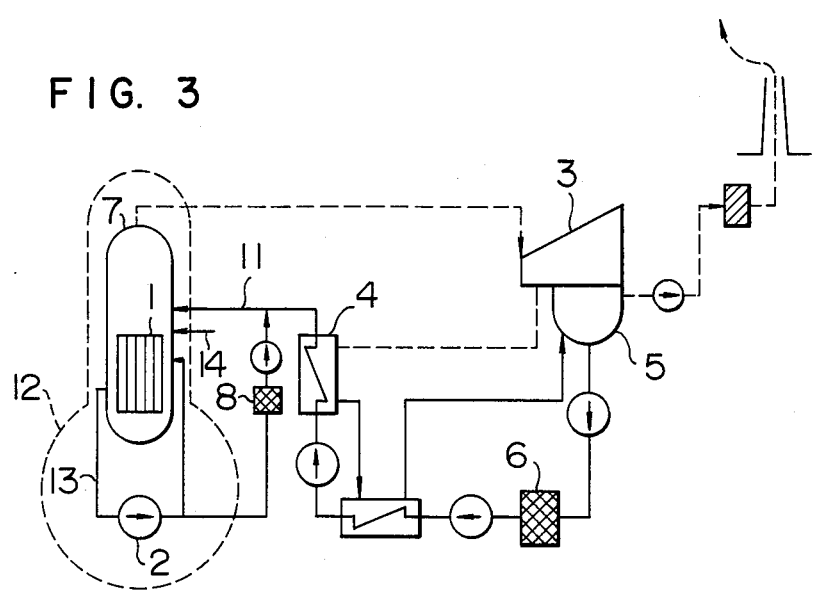
FIG. 3 is a flow diagram showing one embodiment of the present invention.

In FIG. 3, the pH in core water is adjusted by adding an involatile alkali such as NaOH to the core water through alkaline chemical injection line 14, where the pH in core water depends on the amount of injected alkali. A portion of the injected alkali is removed in reactor-purifying unit 8, another portion thereof is carried over by steam to turbine 3 and removed from the core water, and further portion thereof is adsorbed onto the machine members and piping of the primary cooling system.

Generally, the involatile alkali is removed mainly in the reactor-purifying unit among said three removing means. Let the amount of injected alkali be S (moles/hr), the alkali concentration in core water be C (moles/l), the density of core water be $\gamma$ (kg/l), the flow rate in the reactor-purifying unit be $G_C$ (kg/hr), the percent alkali removal in the reactor-purifying unit be $\epsilon$, the flow rate of main steam be Gs (kg/hr), the percent alkali carry-over by steam be $\alpha$, and the total deposition rate to the machine members and piping be $\beta$ (l/hr). The alkali concentration in core water can be obtained according to the following formula (1):

$$C = \frac{1}{\epsilon/\gamma \, G_C + \alpha/\gamma \, G_s + \beta} \qquad (1)$$

In the case of involatile alkali, for example, NaOH, $$\epsilon/\gamma G_C >> \alpha/\gamma G_s, \beta$$

On the other hand, in the case of volatile alkali, for example, $NH_4OH$, $$\alpha/\gamma G_s >> \epsilon/\gamma G_C, \beta$$

Generally, $\epsilon G_C$ depends upon the desired degree of removing metallic impurities from core water in the plant. In the case of adding a volatile alkali, the alkali is carried over by the steam, and thus to keep pH in the core water, that is, the alkali concentration, constant, a larger amount of the alkali must be added than in the case of adding the involatile alkali. Thus, it is preferable to add an involatile alkali rather than a volatile alkali.

The involatile alkali for this purpose includes alkali metal hydroxides such as NaOH and LiOH, alkaline earth metal hydroxides such as $Ca(OH)_2$, and organic alkali compounds. The organic alkali compounds are liable to disappear through radiolysis in the nuclear reactor, and the alkaline earth metal hydroxides are liable to form insoluble impurities, and are readily depositable mainly on fuel rods. On the other hand, the alkali metal hydroxides are stable at a high temperaure even under irradiation of radioactive rays, and are easiest to handle.

Correlation between the amount of NaOH added as an alkali and pH is given below. The NaOH concentration C in core water and pH value H are given according to the following equation (2):

$$H = \log\{(C+10^{-7})10^{14}\} = 14 + \log(C+10^{-7}) \tag{2}$$

Figure 6:
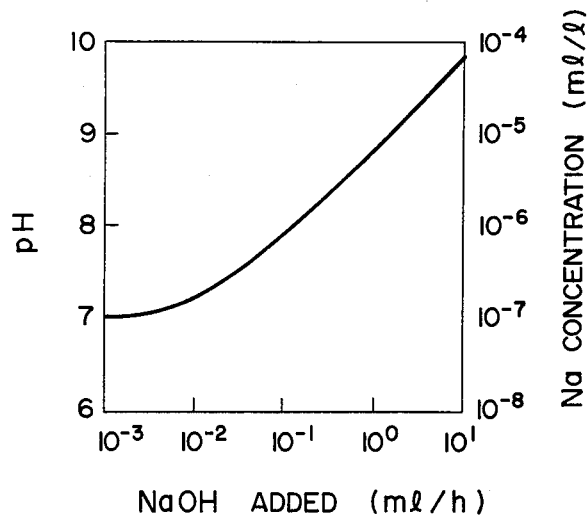
FIG. 6 is a diagram showing calculation results of correlation among the amount of added NaOH to core water, core water pH and Na concentration in core water.

In the standard type BWR (MWe), the flow rate $G_C$ through the reactor-purifying unit is about 100 tons/hr, and when the percent NaOH removal is presumed to be 100% in the reactor-purifying unit, correlation between the amount of injected NaOH and pH as given in FIG. 6 will be obtained.

Figure 7:
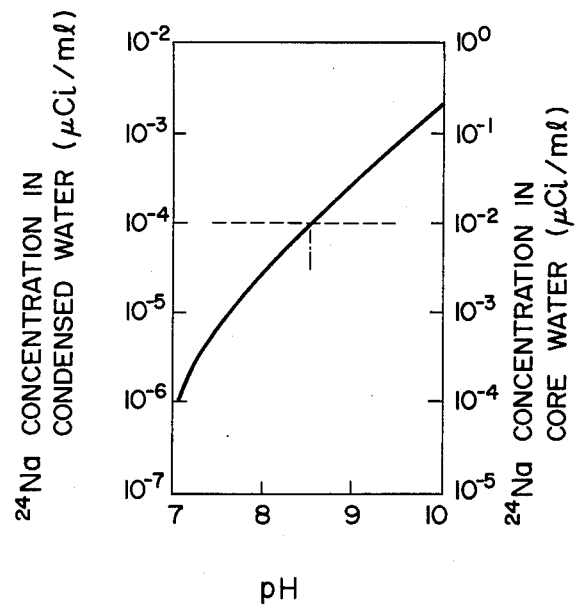
FIG. 7 is a diagram showing calculation results of correlation between core water pH and $^{24}Na$ concentration in condensed water and core water.

The carry-over of NaOH by the main steam is negligible in view of the NaOH material balance, but is not always preferable from the viewpoint of turbine side, particularly because Na is radioactivated in the reactor to form $^{24}Na$ having a half-life of 15 hours. The carry-over rate is increased proportionally to an increasing NaOH concentration in the core water. Correlation between the $^{24}Na$ concentration in condensed water and pH on the basis of the upper limit value of the carry-over rate of involatile component is shown in FIG. 7. When pH is higher than 8.5 in the case of adding NaOH, the radioactivity of condensed water reaches even $10^{-4}$ μCi/ml, and thus more than the necessary pH is not preferable for the control of condensed water radioactivity. Thus, it is important from the viewpoint of controlling an increase in the dose rate in the primary cooling system and maintenance of the entire system to keep the pH of core water at 7-8.5. It is possible to control dissolution of cobalt-60 from fuel rods without any increase in the radioactivity level of condensed water by keeping the pH of core water in said range, and consequently the cobalt-60 concentration in the core water and furthermore the surface dose rate in the machine members and piping of the primary cooling system can be reduced. Particularly preferable pH range is 7.5-8.0.

There is a correlation between the $^{24}Na$ concentrations in core water and pH in core water in the case of adding NaOH as given in FIG. 7. The correlation can be given according to the following equation (3)

$$A = 2 \times 10^{16} \delta \phi (\lambda V_c / G_c) C \tag{3}$$

where
- $\phi$: average thermal neutron flux in nuclear reactor (n/cm².sec.)
- $\delta$: thermal neutron cross-section of $^{23}Na$ (cm²)
- $V_c$: cooling water holdup in nuclear reactor (kg)
- $\lambda$: decay constant of $^{24}Na$ (hr⁻¹)
- $A$: $^{24}Na$ concentration in core water (μCi/ml)

By monitoring $^{24}Na$ concentration from the correlation between $^{24}Na$ concentration and pH in core water given by equations (2) and (3), the core water pH can be determined.

Figure 8:
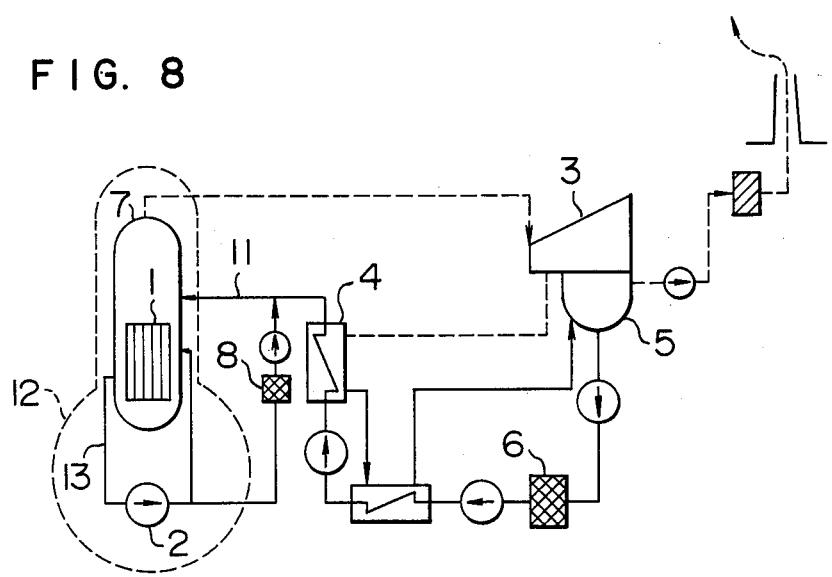
FIG. 8 is a flow diagram showing another embodiment of the present invention to adjust the core water pH by NaOH dissolution from ion exchange resin.

Another embodiment of adjusting pH of core water by adding an alkali is shown in FIG. 8, where cation exchange resin represented by $R—(SO_3H)_2$ is filled in condensed water desalter 6 as a filter, and a portion of the cation exchange resin is substituted with Na as a typical alkali metal. When the cation exchange resin undergoes ion exchange with $Fe^{+2}$ as a typical cation, an alkali is released according to the following reactions:

In the ordinary cation exchange resin,

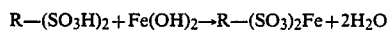

In the Na-substituted form, cation exchange resin,

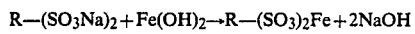

If a mixing ratio of Na-substituted form cation resin to the total cation exchange resin is x, the concentration $C_{Na}$ of NaOH leaking from the outlet of condensed water desalter according to the present embodiment can be obtained according to the following equation (4):

$$C_{Na} = 4 \times 10^{-8} \epsilon \cdot x C_{Fe} \tag{4}$$

where
- $C_{Fe}$: concentration of $Fe^{+2}$ as typical cation in condensed water (ppb)
- $\epsilon$: probability of formed NaOH passable through cation exchange resin layer without trapping in the resin layer $\epsilon$ depends on the properties of cation exchange resin and is estimated to have a value of up to 0.1.

When the cation concentration is constant, pH of core water can be controlled to any desired value by controlling the mixing ratio x of Na-substituted form cation exchange resin from the following correlation equations (5), (6) and (7):

$$S = G_f C_{Na} \tag{5}$$

$$C = S / \epsilon G_c \tag{6}$$

$$H = 14 + \log(C + 10^{-7}) \tag{7}$$

where Gc, C, S and H are the same meanings as defined in the equations (1) and (2), and Gf is a feed water rate.

Figure 9:
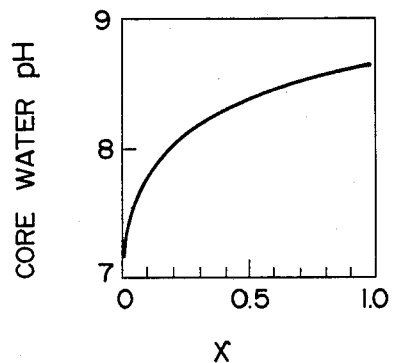
FIG. 9 is a diagram showing calculation results of correlation between the mixing ratio of Na-substituted form cation exchange resin in the entire cation exchange resin and core water pH.

Under typical BWR conditions, Gc/Gf is a value of up to 0.02, $C_{Fe}$ is a value of up to 1.0, and $\epsilon$ is a value of up to 0.1, where correlation between x and H is shown in FIG. 9.

The desired pH of 7.0 to 8.5 can be continuously maintained by setting the mixing ratio x of Na-substituted form cation exchange resin to 0.1 to 0.5 according to equation (8) as will be given later without providing a special means for injecting an alkali. Against any fluctuation in the cation concentration $C_{Fe}$ in condensed water the pH can be kept in said desired range by changing the mixing ratio of the Na-substituted form cation exchange resin. Furthermore, the pH can be kept in said desired range by keeping the $^{24}Na$ level in core water constant as shown above.

A preferable embodiment for replacing a portion of cation exchange resin with the Na-substituted form cation exchange resin is shown below.

Figure 10:
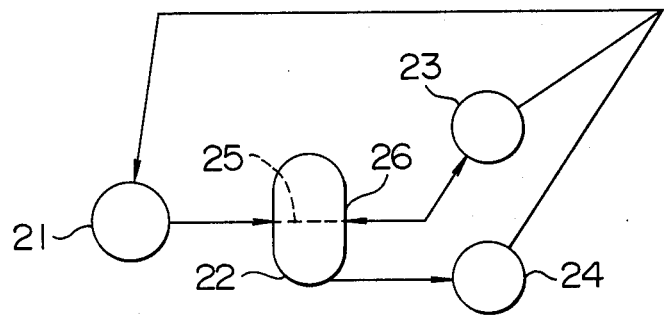
FIG. 10 is a flow diagram showing a regenerating operation for a desalter to form Na-substituted form cation exchange resin.

Usually, a condensed water desalter uses a mixture of cation exchange resin and anion exchange resin, and regenerating treatment for recovering the ion exchanging capacity is carried out by separating the cation exchange resin and the anion exchange resin from each other by difference in specific gravity and chemically regenerating the cation exchange resin with H₂SO₄ and the anion exchange resin with NaOH. FIG. 10 schematically shows the present embodiment. The mixture of ion exchange resins is transferred from condensed water desalter 21 to anion-cation separating column 22, where the anion exchange resin and the cation exchange resin are separated from each other by the difference in specific gravity. The separated anion exchange resin is led to anion exchange resin-regenerating column 23, while the cation exchange resin to cation exchange resin-regenerating column 24, where the former is regenerated with NaOH, and the latter with H₂SO₄.

The regeneration reactions proceed as follows:
In the cation exchange resin-regenerating column,

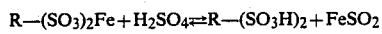

$$R—(SO_3)_2Fe + H_2SO_4 \rightleftharpoons R—(SO_3H)_2 + FeSO_2$$

The reaction usually proceeds from the right side to the left side, but the reversed proceding, that is, from the left side to the right side, is possible by using about 1N H₂SO₄, whereby the cations trapped on the resin can be released as sulfate.

Separation of anion exchange resin from cation exchange resin in the anion exchange resin-cation exchange resin separating column is carried out by the difference in specific gravity between the two resins, and the cation exchange resin having a larger specific gravity is withdrawn from the bottom of the separating column, whereas the anion exchange resin having a smaller specific gravity is withdrawn through nozzle 26 on separation level 25 at an intermediate height of the separating column. Separation level 25 differs from one plant to another and can be provided near the bottom or the top upon proper selection in view of the predetermined mixing ratio of anion exchange resin to cation exchange resin.

In the present embodiment, the anion exchange resin and the cation exchange resin are mixed at an mixing ratio y' by volume in excess of the predetermined mixing ratio y of the anion exchange resin to the cation exchange resin. As a result, 100% cation exchange resin can be withdrawn from the bottom and a mixture of the anion exchange resin and the cation exchange resin from the separating level.

In the anion exchange resin-regenerating column, regeneration is carried out with NaOH, where regeneration of cation exchange resin proceeds as follows:

$$R—(SO_3)_2Fe + NaOH \rightleftharpoons R—(SO_3Na)_2 + Fe(OH)_2$$

$$R—(SO_3H)_2 + NaOH \rightleftharpoons R—(SO_3Na)_2 + 2H_2O$$

By returning the regenerated anion exchange resin and cation exchange resin to the condensed water desalter, the mixing ratio x of the Na-substituted form cation exchange resin in the condensed water desalter will be as follows:

$$x = \frac{y - y'}{1 + y'} \qquad (8)$$

To meet a fluctuation in the cation concentration in the condensed water or to meet the pH of core water to be predetermined, the mixing ratio x can be adjusted by replacing a portion of the resin mixture with anion exchange resin in the anion exchange resin-regenerating column before the regeneration, thereby reducing the ratio x, or by replacing it with cation exchange resin, thereby increasing the ratio x.

By replacing the regenerating solution for the anion exchange resin-regenerating column with a solution of LiOH, or others, leakage of any desired alkali species is made possible.

According to further embodiment of the present invention, a portion of cation exchange resin is replaced with Na-substituted form cation exchange resin in the same manner as shown in FIG. 10 at the regeneration of reactor-purifying desalter 8 in place of the condensed water desalter shown in FIG. 8. It is also possible to add NaOH to core water by mixing Na-substituted form cation exchange resin with the cation exchange resin for both condensed water desalter and reactor-purifying desalter.

According to still further embodiment of the present invention, a portion of cation exchange resin as powdery resin used in the condensed water desalter or reactor-purifying desalter can be replaced with Na-substituted form cation exchange resin. The non-regenerative use of powdery resin is usual, and thus a portion of Na-substituted form cation exchange resin is made ready before precoating and can be used in mixture with the ordinary H-form cation exchange resin.

According to the present invention, it is possible to suppress any increase in the concentration of radioactive corrosion products in core water in a direct cycle type, light water-cooled nuclear reactor without any substantial change in the plant hardware even if there are such disturbances as a resin leakage or lowering of pH in the core water. Particularly, the present invention can be readily applied to the existing plants without any substantial change in the plant hardware. This is a remarkable advantage of the present invention.

What is claimed is:

1. In the method of controlling the dissolution of radioactive corrosion products deposited on the surface of fuel rods into the core water of a boiling water-type atomic power plant including a nuclear reactor having a recycling system with a reactor water-purifying unit, a turbine generator driven by steam generated in the nuclear reactor, a condensor, a condensed water-purifying unit, and a water heater positioned in the recycling system; wherein the improvement comprises, passing the reactor water of the recycling system through the reactor water-purifying unit containing a cation exchange resin, wherein a portion of said cation exchange resin had been previously replaced with an alkali metal-form cation exchange resin, and passing the condensed water of the recycling system through a condensed water-purifying unit containing a cation exchange resin, wherein a portion of said cation exchange resin had been previously replaced with an alkali metal-form cation exchange resin, so as to cause the pH of the reactor water and condensed water to be adjusted to a pH of between about 7.0 and 8.5 through the ion exchange reaction of the alkali metal-form cation exchange resins with the cations contained in the reactor water and the condensor water of the recycling system whereby the dissolution of radioactive corrosion products deposited on the surface of the fuel rods into the core water of a boiling water-type atomic power plant is controlled.

2. The method of claim 1 wherein said pH is maintained between 7.5 and 8.0.

3. The method of claim 1 wherein said radioactive corrosion product is cobalt ferrite.

4. The method of claim 1 wherein said radioactive corrosion product is nickel ferrite.

5. The method of claim 1 wherein said alkali-form cation exchange resins is a Na-form cation exchange resin.

6. The method of claim 1 wherein the reactor water-purifying unit and the condensed water-purifying unit contain a mixture of cation exchange resin and anion exchange resin with said cation exchange resin being in excess of said anion exchange resin, wherein said excess portion of the cation exchange resin is regenerated together with the anion exchange resin with an alkali, thereby converting the excess portion of the cation exchange resin into an alkali-form cation exchange resin.

7. The method of claim 6 wherein said alkali-form cation exchange resin is a Na-form cation exchange resin.

8. The method according to claim 7 wherein the ratio of the Na-form cation exchange resin produced to the total cation exchange resin is 0.1 to 0.5.

9. The method of claim 7 wherein said Na-form cation exchange resin has the formula $R-(SO_3Na)_2$.

* * * * *